United States Patent [19]

Mooney

[11] 4,077,087

[45] Mar. 7, 1978

[54] CASTER AND BRAKE ASSEMBLY

[75] Inventor: Paul C. Mooney, Northbrook, Ill.

[73] Assignee: Quick-Set, Incorporated, Northbrook, Ill.

[21] Appl. No.: 749,530

[22] Filed: Dec. 10, 1976

[51] Int. Cl.² .......................................... B60B 33/02
[52] U.S. Cl. ................................. 16/35 R; 188/1 D
[58] Field of Search ............... 188/1 D, 29; 16/35 R, 16/35 D

[56] References Cited

U.S. PATENT DOCUMENTS

| | | | |
|---|---|---|---|
| 1,633,638 | 6/1927 | Jarvis et al. | 16/35 R |
| 2,138,433 | 11/1938 | Sunden | 188/1 D |
| 2,828,833 | 4/1958 | Civello | 188/29 |
| 2,900,659 | 8/1959 | Snell | 188/1 D |
| 3,162,888 | 12/1964 | Mobus | 16/35 D |
| 3,388,419 | 6/1968 | Crawford | 188/1 D X |
| 3,518,714 | 7/1970 | Hager | 16/35 R |
| 3,772,733 | 11/1973 | Stosberg et al. | 16/35 R |
| 3,828,392 | 8/1972 | Bolger | 16/35 R |
| 3,881,216 | 5/1975 | Fontana | 16/35 R |
| 3,890,669 | 6/1975 | Reinhards | 16/35 R |
| 3,902,576 | 9/1975 | Pitan et al. | 188/1 D |
| 3,911,525 | 10/1975 | Haussels | 16/35 R |
| 3,914,821 | 10/1975 | Screen | 16/35 R |
| 3,949,444 | 4/1976 | Mattinson | 16/35 R |

Primary Examiner—George E. A. Halvosa
Attorney, Agent, or Firm—Wegner, Stellman, McCord, Wiles & Wood

[57] ABSTRACT

A wedge-shaped brake mounted within a clevis of a swivel caster precludes rectilinear motion as well as swivel motion when engaged. Engagement of the brake is effected by the use of a pedal or lever and when not in its locking position, the brake remains removed from the caster wheel surface. The frictionally engaged brake increases the distance between the caster support or clevis and the axle of the wheel to remove or take up all tolerances in one direction eliminating all movement through caster parts. Several alternative brake-engaging mechanisms are disclosed.

7 Claims, 6 Drawing Figures

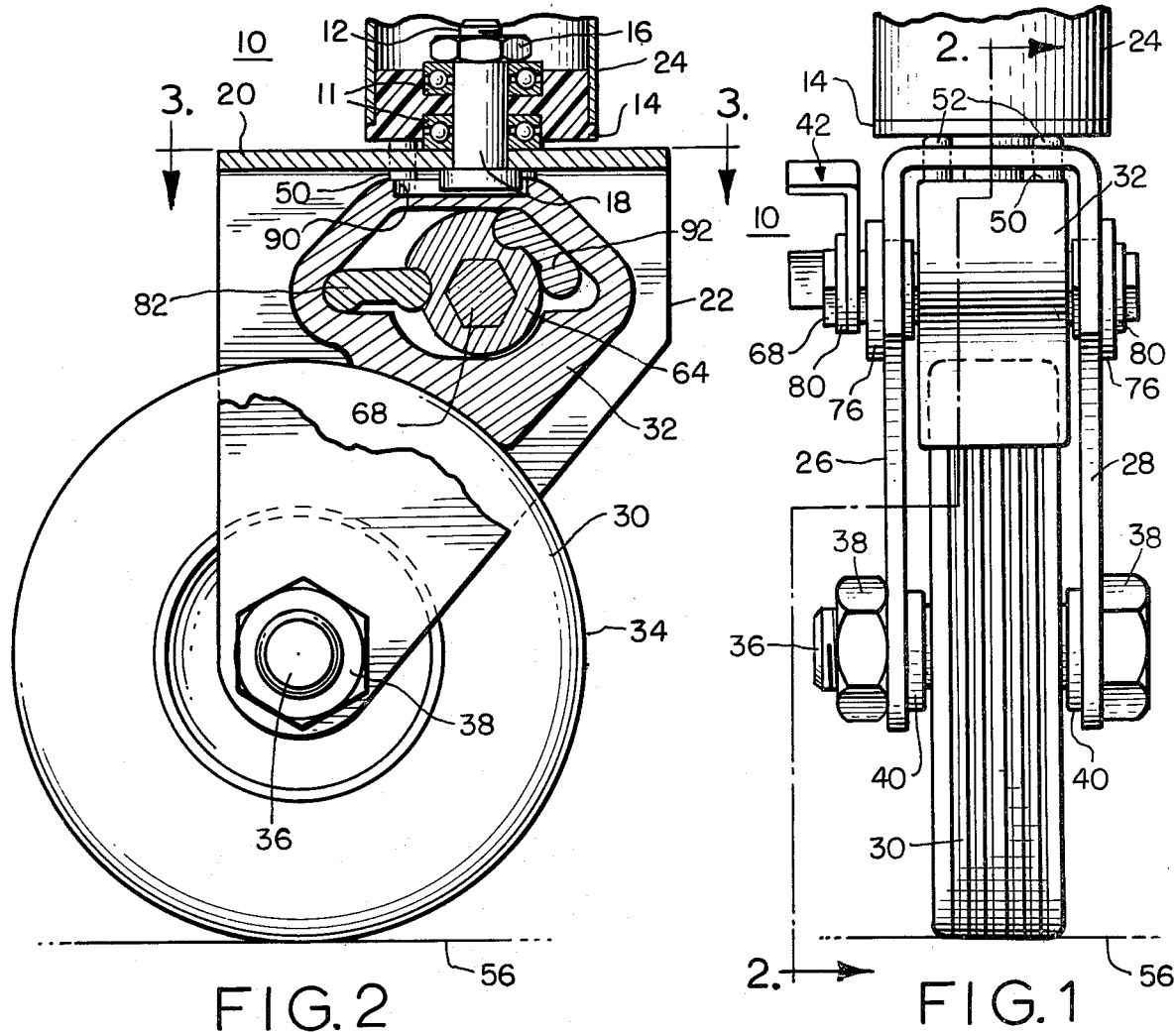
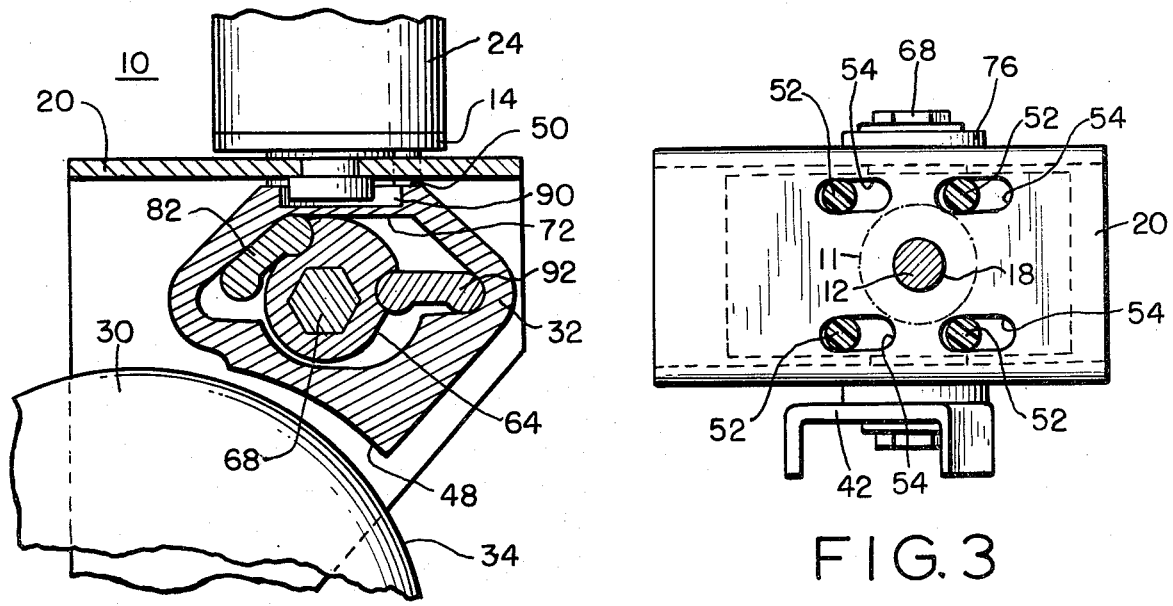

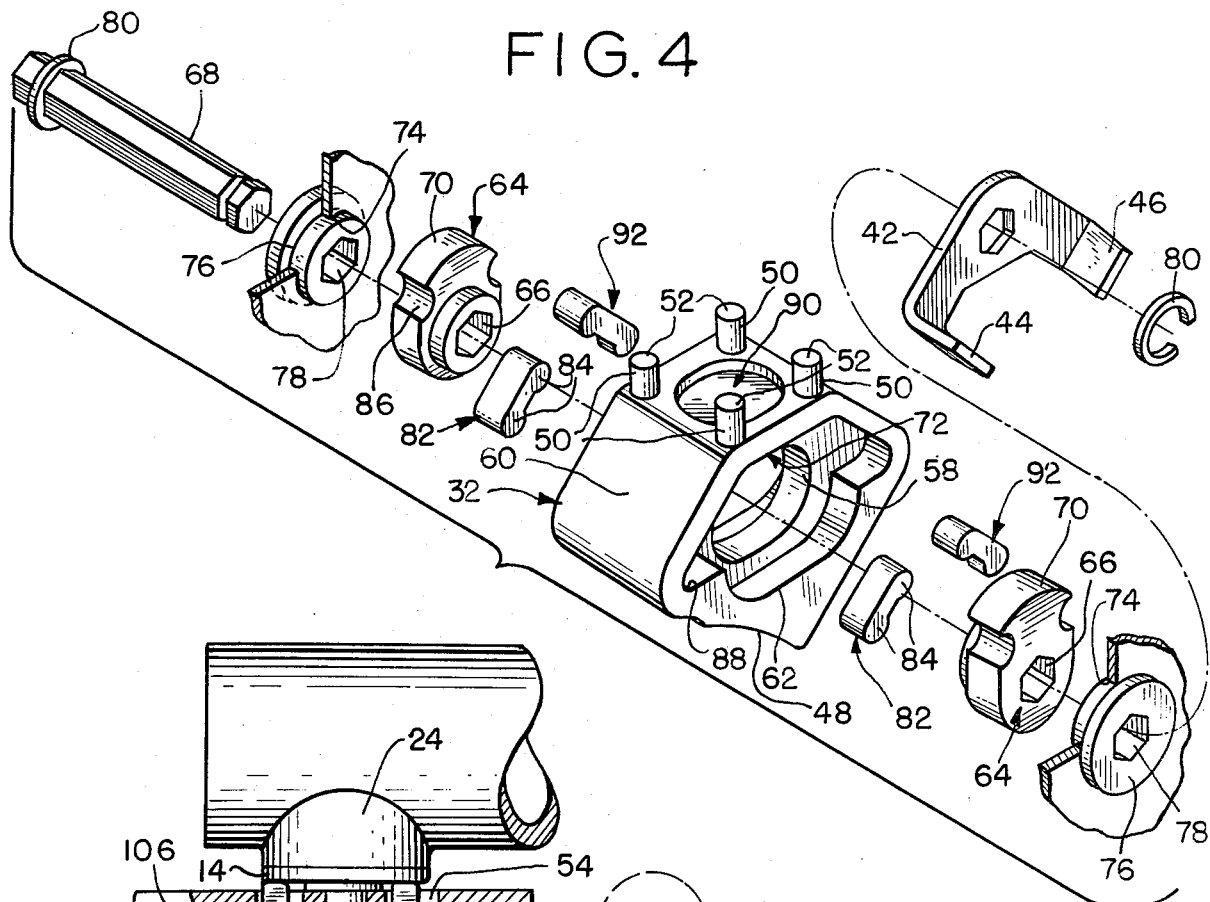
FIG. 4
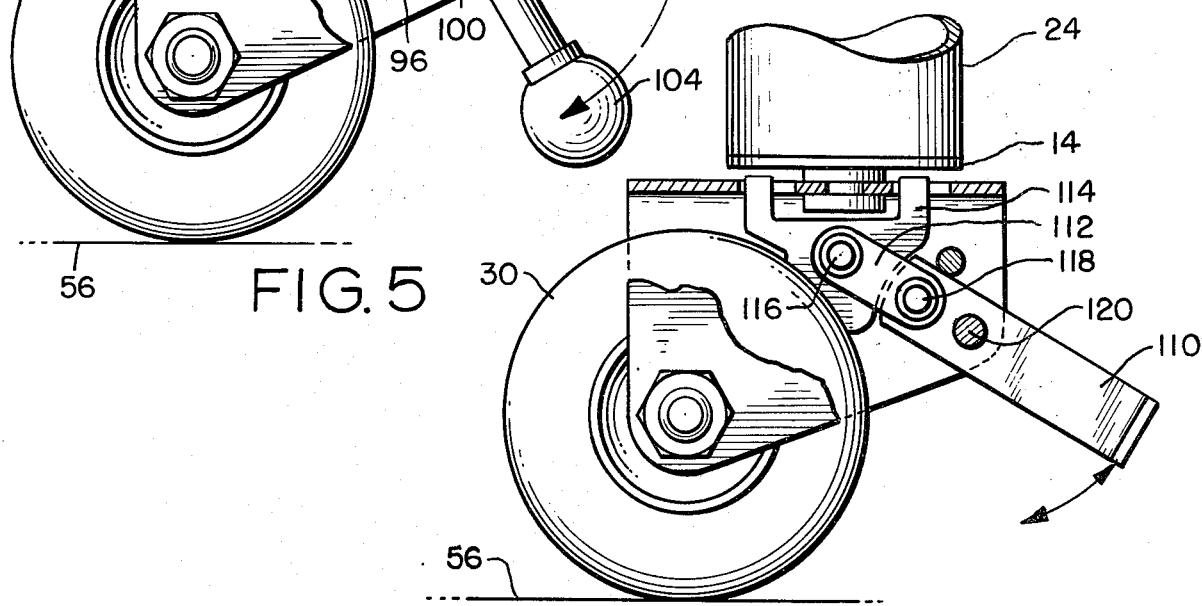
FIG. 5
FIG. 6

CASTER AND BRAKE ASSEMBLY

BACKGROUND OF THE INVENTION

This invention relates to braking devices capable of precluding rectilinear and swivel motion as well as movement through part tolerances and, more particularly, to an improved caster having such a braking device.

There are a variety of casters available that provide individual locking of the wheel and of the swivel. There are also casters which preclude rectilinear motion and swivel motion by a single frictional brake. Basically, these casters employ a friction brake to engage the wheel and a pawl pivotably mounted on the caster horn or clevis to preclude the swivel.

These devices are versatile and have wide applications and are capable of carrying and moving heavy loads. However, such casters have not been successfully employed in combination with loads that are sensitive to jiggle and slight movement once the brake is engaged. For example, cameras, such as T.V. cameras, are often moved on tripods supported on dollies equipped with casters. When the caster brake is engaged, it is intended that the camera have a firm and fixed foundational base. Casters of the prior art, as heretofore employed, do not provide the required stability because the small tolerances of the machined parts are not removed when the brake is engaged. Hence, the camera or other jiggle-sensitive load is not firmly positioned, and the most desirable results are not obtained.

Considering the drawbacks of the prior art, I have developed a caster which, in combination with an engageable wedge-shaped brake, precludes rectilinear and swivel motion while at the same time reducing any existing tolerances to assure jiggle-free support of its load.

SUMMARY OF THE INVENTION

A U-shaped clevis is attached to the base of a vehicle, such as a dolly, and a rotatable wheel is mounted on an axle journaled in the clevis. A wedge-shaped brake is positioned within the clevis from side to side and located between the axle and the base of the vehicle. Engagement and disengagement means controllably provide slidable horizontal movement of the brake. When the brake is engaged, the wheel is urged against the axle to preclude rectilinear motion. Under this condition, the brake is also urged against the base of the vehicle through the clevis to preclude the swivel motion. All movement through caster parts is therefore eliminated. Alternative engagement mechanisms are provided, the selection of which depends upon the intended use of the caster and vehicle.

A principal feature of this invention is to provide a caster which has a brake to restrain motion of the vehicle.

Another feature of this invention is to provide a brake which removes any existing tolerances when engaged.

Yet another feature of the invention includes a device which provides braking action and eliminates movement through the caster parts by a wedge-shaped structure engageable by a single motion of a lever or arm.

Another feature of the invention is to provide alternative engagement means to control the engagement and disengagement of the wedge-shaped brake.

Other features of the invention will be apparent when considering the drawings.

BRIEF DESCRIPTION OF THE DRAWINGS

FIG. 1 depicts a front view of the caster assembly in accordance with the present invention;

FIG. 2 shows a cut-away side view of the clevis wherein the wedge-shaped brake is shown in its engaged position;

FIG. 2a depicts the caster assembly in accordance with the present invention wherein the brake is disengaged;

FIG. 3 is a sectional view of the top of the clevis as shown in FIG. 2;

FIG. 4 is an exploded view of one form of brake shoe assembly;

FIG. 5 shows an alternative embodiment to the brake-engaging structure;

FIG. 6 shows yet another alternative embodiment to the brake-engaging structure.

DESCRIPTION OF THE PREFERRED EMBODIMENTS

Referring to FIGS. 1-4, caster 10 is capable of swiveling about bearings 11. Kingpin or bolt 12 holds the bearings in engagement with insert 14 by a retaining nut 16. Bolt 12 is received by bore 18 in the upper surface 20 of clevis 22 with respect to leg 24. Insert 14 conforms to the shape of vehicle leg 24 and is fixedly attached therein by an adhesive, press-fit, screws or other appropriate means. Insert 14 may be made of Delrin, available from the E. I. du Pont de Nemours Company, Inc., or other suitable material. Clevis 22, having sides 26 and 28 which house wheel 30, provides the swivel action about kingpin or bolt 12 when brake shoe 32 is disengaged from wheel surface 34. Wheel 30 freely rotates on axle 36 in the well known manner and the axle is attached to sides 26 and 28 of clevis 22 by nuts 38 and bushings 40. The wheel may have a smooth or treaded surface.

Brake shoe 32 is engaged and disengaged by rotating lever 42, which may be externally mounted on either side of clevis 22. The lever may have foot-engageable outwardly extending toe tabs 44 and 46. When the brake shoe 32 is engaged, both rectilinear motion of wheel and swivel motion around bolt 12 are precluded. When the brake shoe 32 is disengaged, neither motion is restrained.

FIG. 2 depicts the brake shoe 32 in its engaged position. Shoe surface 48, which generally conforms to the wheel surface 34, is in engagement with the wheel to preclude rectilinear motion while posts 50, having protruding surface 52, which extend through elongated bores 54 of the upper surface 20 of clevis 22, frictionally engage insert 14 to preclude swivel. Thus, brake shoe 32 acts as a wedge operative between leg 24 and axle 36. The wedging action provided therebetween removes or takes up any existing tolerances between leg 24 and axle 36. For example, any tolerances between axle 36 and the bore in wheel 30 is forced to one side when the brake is engaged, thus providing a solid support of leg 18 to floor 56 under wheel 30.

FIG. 2a depicts the brake shoe 32 in its disengaged position wherein shoe surface 48 is removed from wheel surface 34 and protruding surfaces 52 are removed from insert 14. Therefore, no frictional engagement between the brake shoe 32 and the insert 14 occurs when the brake is disengaged, and motion is not restrained.

Brake shoe 32 may be made of plastic, metal, or other suitable material which can be easily machined, and which is capable of retaining frictional engagement with wheel 30 as well as insert 14. The embodiment shown in FIG. 4 is a single piece of material, cast and machined, and has a web 58 defining a left section 60 and a right section 62. Each section is shown to house a rotor 64 and an eccentrically located bore 66 which receives shaft 68. The weight of the shoe is borne upon rotor 64 when disengaged. Each rotor 64 has a surface 70 concentric with the axis of the shaft 68 to engage flat surface 72 in the shoe and thus support the shoe off the wheel tread when the brake is disengaged. The shaft 68 is journaled in clevis 22 at bore 74 by bearings 76. The bearings 76 each have a bore 78 which engage the shaft 68. The bearings 76 are permitted to rotate in bore 74 of clevis 22 which rotation is caused by rotational movement of lever 42. Retaining lock rings 80 restrain lateral movement of shaft 68. Although shaft 68 and bore 78 are shown to be hexagonal in shape, any particular non-round shape of shaft 68 which conforms to bore 78 would be acceptable as long as lever 42 controllably provides for the rotational movement of rotors 64. Also, it is apparent that one continuous rotor may take the place of the two rotors 64 by removing web 58 from the shoe. The internal surface of each side of the web would, in such instance, be continuous through the shoe from side to side.

The brake shoe 32 and its operational parts are simply assembled and held in the clevis 22 by the closeness of the assembly to sides 26 and 28. A preferred operation of the shoe between the engaged and disengaged positions may be accomplished by links between the rotor and the shoe. Herein, links 82, having enlarged cylindrical end parts 84, engage both the rotor 64 and the shoe 32, forcing the shoe into wedged braking relation with the wheel surface 34 and the posts 50 with protruding surface 52 in braking relation with insert 14. Each rotor is equipped with a socket 86 complementarily shaped to the cylindrical end part 84 of link 82. The shoe is shaped with a cylindrical socket 88 to receive the other end of link 82. When the rotor is turned from the FIG. 2a position to the FIG. 2 position, the link 82 pushes the shoe into braking relation. If desired, link 82 may be pivotably connected to both the shoe and the rotor to effect withdrawal of the shoe from the engaged position when the rotor is turned from the FIG. 2 position to the FIG. 2a position. Elongated recess 90 at the top of brake shoe 32 provides for nonrestrictive slidable movement past the head of kingpin or bolt 12.

A second set of links 92 is provided to position the shoe into the disengaged position. Links 92 are duplications of links 82 and are similarly provided with cylindrical end parts received in cylindrical sockets in the rotor and the shoe as illustrated. Clockwise rotation of the rotor (FIG. 2) allows links 92 to move the shoe into the disengaged position, the shoe riding downwardly until surface 72 contacts curved surface 70 on the rotors 64.

Referring to FIG. 5, an alternative lever system is shown. Specifically, a cam 94 and a cam follower 96 operate upon a brake assembly 98, as shown. Bore 100 receives shaft 102 on which is eccentrically mounted the cam 94. Cam 94 engages the cam follower 96 to urge the brake assembly 98 against the wheel 30 and the insert 14. Lever 104, shown in its downward position indicating engagement of the brake, is rotated counter-clockwise for disengagement. Spring 106, located on the opposite side of the brake assembly 98 and held within the clevis 22 by pin 108, urges brake assembly 98 outwardly from the wheel surface when lever 104 disengages the brake assembly 98. A support for holding the shoe off the wheel tread may be provided in the housing for the wheel when the brake is released.

Referring to FIG. 6, another type of brake actuation lever is shown in combination with the brake of the present invention. Lever 110, which is coupled to toggle 112, provides for locking the brake assembly 114 against insert 14 and wheel 30. Toggle 112 is coupled to the brake assembly 114 by pin 116 and to lever 110 by pin 118. The lever 110 is retained on either side of the clevis by shaft 120 which provides for rotational movement thereabout. Movement of lever 110 from its toggle position disengages brake assembly 114.

I claim:

1. In a swivel caster having a base attached to a vehicle and a clevis supported from a kingpin having a longitudinal axis and secured to the base for swivel motion about the base, the clevis supporting a wheel, the wheel being rotatable on an axle, the improvement comprising:

the base secured to the vehicle to form an integral part therewith and having a generally flat lower surface;

wedge-shaped brake means mounted in said clevis and including portions extending through the clevis adjacent said kingpin along axes generally parallel to the longitudinal axis of said kingpin, said brake means engageable with the wheel and the flat lower surface of the base to preclude rectilinear and swivel motion of the vehicle when engaged;

means for selectively moving said brake means into engagement with the wheel and said flat lower surface; and means for selectively moving said brake means into disengagement from the wheel and said flat lower surface.

2. The caster as claimed in claim 1 wherein said flat lower surface is of Delrin and the wedge-shaped brake is of metal.

3. The caster as claimed in claim 1 wherein the means for selectively moving said brake means into engagement and the means for selectively moving the brake means into disengagement include:

rotor means having a first and a second socket, said rotor means operated by a lever for causing engagement and disengagement of the wedge-shaped brake;

link means each having a first and a second end portion, the first end portion adapted to receive the socket and said second end portion engageable with a corresponding surface within the wedge-shaped brake;

said link means being toggled between said rotor and said wedge-shaped brake when said wedge-shaped brake is either in engagement or disengagement.

4. The caster as claimed in claim 3 wherein the rotor means includes a surface on which the wedge-shaped brake rides when the lever is operated so that the wedge-shaped brake does not drag on the surface of the wheel.

5. The caster as claimed in claim 1 wherein the means for selectively moving said brake means into disengagement include a spring disposed between the wedge-shaped brake and the clevis; and the means for selectively moving said brake means into engagement include a cam riding on an axle journaled in the clevis, coupled to a lever, and a cam follower disposed on said wedge-shaped brake.

6. The caster as claimed in claim 1 wherein the means for selectively moving said brake means into engagement and said means for selectively moving said brake into disengagement include:

a lever pivotably mounted on the clevis;

toggle means having a first and a second end, said first end rotatably coupled to the lever by a pin;

means protruding from said wedge-shaped brake means for receiving said second end of the toggle means so that movement of the lever controls the engagement and the disengagement of the brake means.

7. In a swivel caster having a base attached to a vehicle and a clevis supported from a kingpin having a longitudinal axis and secured to the base, the clevis supporting a wheel, the wheel being rotatable on an axle, the improvement comprising:

an insert forming the base and having a generally flat lower surface;

wedge-shaped brake means mounted in the clevis and including engaging means extending through the clevis including portions extending adjacent said kingpin along axes generally parallel to the longitudinal axis of said kingpin, which engaging means frictionally engage the flat lower surface of the insert to preclude swivel motion when engaged; and a surface generally conforming to the shape of the wheel to preclude rectilinear motion when engaged; the engagement of said wedge-shaped brake means removing all tolerances between the axle and the base to prevent jiggle of the vehicle;

means for selectively moving said wedge-shaped brake means into and out of engagement with the wheel and the base including a manipulatable rotor mounted in the clevis and a link connecting said rotor and brake means providing desired movement of said brake means toward and away from said wheel, said rotor having a surface supporting said brake means off the wheel when restricted away from the wheel.

* * * * *